United States Patent [19]
Young

[11] 4,147,821
[45] Apr. 3, 1979

[54] IMPREGNATION OF POROUS ARTICLES

[75] Inventor: Peter D. Young, St. Andrews, Channel Islands

[73] Assignee: Ultraseal International Limited, Guernsey, Channel Islands

[21] Appl. No.: 790,912

[22] Filed: Apr. 26, 1977

[30] Foreign Application Priority Data

Aug. 17, 1976 [GB] United Kingdom .................. 6217/76

[51] Int. Cl.$^2$ ........................ B08B 7/00; C23D 17/00; B05D 3/00
[52] U.S. Cl. ................................ 427/295; 427/388 R; 106/287.24; 526/298; 134/38; 252/DIG. 1; 252/DIG. 8; 427/340; 427/350; 428/539.5
[58] Field of Search .................... 427/295, 388 R, 340, 427/350; 526/298; 106/287 R; 134/38; 252/89 R, DIG. 1, DIG. 8

[56] References Cited

U.S. PATENT DOCUMENTS

| | | | |
|---|---|---|---|
| 3,940,362 | 2/1976 | Overhults | 526/298 X |
| 3,969,552 | 7/1976 | Malofsky et al. | 427/295 |

FOREIGN PATENT DOCUMENTS

| | | | |
|---|---|---|---|
| 1297103 | 11/1972 | United Kingdom | 427/295 |
| 1308947 | 3/1973 | United Kingdom | 427/295 |

*Primary Examiner*—Michael R. Lusignan
*Attorney, Agent, or Firm*—Oblon, Fisher, Spivak, McClelland & Maier

[57] ABSTRACT

This invention relates to the impregnation of rigid porous articles, particularly metal castings. In its preferred form the impregnant is a liquid mixture of monofunctional (meth)acrylic ester and a relatively small proportion of polyfunctional (meth)acrylic ester to provide a cross linked product on curing and to facilitate washing of the casting with water and an emulsifier. A peroxy or other free radical catalyst such as AZBN is associated in the impregnant with an inhibitor such as a hydroquinone derivative so that curing can be effected at a temperature of 90° C. within 3 to 15 minutes. Curing is preferably effected by immersion in a hot water bath.

19 Claims, No Drawings

IMPREGNATION OF POROUS ARTICLES

The invention relates to the sealing of pores in porous rigid articles, particularly metal castings, but also materials such as wood or inorganic materials such as brick, stone or concrete. It is however important that the pores in the material are not so big as to permit leaching out of the impregnant.

The impregnation of metal castings with resins to seal porosity is a process which is well established. Porosity in castings is invariably inconsistent in size and shape, thus rendering the components unusable due to leakage. This is especially true where they are subjected to pressure. Apart from this well known cause for rejection of castings used in the motor industry there are many other problems caused by porosity including plating failures, "blow out" during stove enamelling, and sites for corrosion, entrapment of organic material and possible bacteria growth.

Generally, porosity can be divided into three types: through porosity, blind porosity and enclosed porosity. Through porosity causes leakage and is the type with which founders are primarily concerned. Blind porosity, having one entrance to the surface only, will not produce a leakage but can cause surface finishing problems through absorption of treatment fluids. Enclosed porosity causes no problems unless present in excess where it can cause structural failure. Other similar defects often encountered in the foundry include cold laps, cracks, blow holes, and inclusions all of which are often referred to, incorrectly, as forms of porosity. Frequently examination of a casting rejected for leakage and marked by the inspector as porous, reveals that it actually has a cold lap, crack or a blow hole.

Various methods of sealing porosity employed over the years include plugging, coating with epoxy resin, and welding. All of these techniques are highly labour intensive and therefore expensive, and there is no guarantee that the treatment will be successful.

A straightforward method in common use employs a solution of a high molecular weight polymer. The cleaned components are simply dipped into the solution for several minutes and on removal and subsequent evaporation of the solvent sealing is accomplished. This technique is not suitable for use on highly machined components that are to meet tight dimensional tolerances due to the thin flim of polymer left on the surfaces. In addition any surface treatments such as conversion coating, anodic or chemical, that are called for, must be carried out prior to dipping. As penetration is limited and incomplete filling of the pores with resin is an inescapable consequence of employing solvent, more than one treatment may be required and tightness of the casting at high pressures must not be expected.

The process of vacuum impregnation came into use some twenty five years ago and over this period many types of sealants have been used, all with varying degrees of success, from "Bakelite" varnish to sodium silicate and a wide range of polyesters. Modern processes of this type employ specially tailored unsaturated polyesters that have high penetration power in combination with low viscosity monomers such as styrene. Typically, the unsaturated polyesters are reaction products of phthalic anhydride and maleic anhydride with propylene glycol. A combination of inhibitors and catalysts is chosen to stabilise the viscosity of the impregnant during production runs and to give suitable curing at temperatures in the region of 130° C. Cross linking of the linear polyester by styrene results in a hard, solvent resistant resin which completely fills the pores. A typical manufacturing process involves placing the cleaned, cold castings in an autoclave and subjecting them to a vacuum of not less than 12.7 mms of Hg for a minimum of 20 minutes. At this point the impregnant is admitted to the autoclave and brought to a level approximately two inches above the castings. Pressure of 90 to 100 lbs. per sq. in. is then applied to the autoclave for 30 minutes or more.

The impregnant fluid is then returned to the storage tank to allow the removal of the castings and their transfer to the wash tank for the removal of the surface film left by the sealant. After a short draining period, the parts are submerged in an oil for 45–60 minutes at 130° C or alternatively placed in a hot air recirculation oven for 1½ hours. The final steps are to transfer the parts to a fresh water rinse to remove surface contamination. With this existing method of treatment pressure tightness of up to 12,000 lb. per sq. in. can be obtained within a temperature range of $-40°$ C. to $+250°$ C.

Alternative systems to the polyester system have been suggested and these include the (meth)acrylic ester systems described in U.K. Pat. Nos. 1,297,103 and 1,308,947. One of the basic problems with such a (meth)acrylic ester system is that the monomer(s) should have an adequate pot life and yet should polymerise readily in the pores of the casting when required. U.K. Pat. No. 1,297,103 uses an anaerobic system in which a combination of a peroxy catalyst and an accelerator is used and in which the impregnant is aerated continuously up till the moment of use. The impregnant in the deeper part of the pores cures through absence of air but a special curing agent has to be applied to the impregnated casting. A high proportion of (meth)acrylic ester(s) of polyfunctional alcohols is used (more than is necessary for cross-linking the cured product) to enhance the anerobic effect but this means that the monomers are highly polar and excess monomer cannot be effectively washed off the casting prior to curing by means of water and an emulsifier. Instead solvents such as trichloroethylene are used which leads to added expense not only in the initial cost of the solvent but also in the cost of distillation to recover it. There are further difficulties in preventing the noxious solvent vapours affecting personnel.

U.K. Pat. No. 1,308,947 approaches the problem in a different way and discloses a monomer system which cures without a catalyst but with heating. Here the (meth)acrylic ester system is derived solely from polyhydric alcohols to give the necessary cure properties. Although the specification describes washing with water and an emulsifier, good washing (e.g. where fine tolerances in the impregnated castings are required or electroplating is envisaged) is not in practice achievable in this way because of the polar nature of the monomers.

There is thus a need for an impregnant which has an adequate pot life without aeration yet cures rapidly at relatively low temperatures, which has a low viscosity to achieve penetration yet is not too volatile, and which is sufficiently polar to give solvent resistance in the cured casting yet is not polar to such an extend that an excess on the surface of the casting cannot be effectively washed away by a combination of water and a commercially available emulsifier.

I have now found, surprisingly, that the complexities of U.K. Specification 1,297,103 and the limitations of the monomer system of U.K. Pat. No. 1,308,947 can be avoided by using a combination of peroxy catalyst, e.g. as described in U.K. Pat. No. 1,297,103, and an inhibitor, and that by using a suitable catalyst/inhibitor combination, the impregnant can be cured simply and cheaply by immersion in a water bath. What is more the monomer system can be adjusted to give the desired monomer and polymer properties.

According to one aspect, the invention provides a stable heat curable impregnant for porous rigid articles comprising a liquid substantially wholly (meth)acrylic monomer system having at least some polyfunctional monomer therein, a peroxy or other free radial catalyst therefor and an inhibitor for the catalyst, the inhibitor and catalyst being in such proportions that curing can be effected at a temperature of 90° C. within 3 to 15 minutes. Preferably the monomer system is a (meth)acrylic ester monomer system and the ester(s) is at least partly polyfunctional.

According to another aspect, the invention provides a method of impregnation porous rigid articles using such an impregnant which comprises degassing the article under reduced pressure, washing the article with water (or with water and an emulsifier if the emulsifier is not present in the impregnant) to remove excess impregnant from the surfaces of the article and curing the impregnant by heating the article to a temperature not greater than 100° C.

Although monomer systems are hereinafter described which contain mixtures of monofunctional and polyfunctional esters, the esters need not be added separately and the mixture can be a reaction product. By substantially wholly there is meant a proportion of at least 70% preferably 90%.

The process of the invention which is here disclosed enables impregnation to be carried out at four to five times the rate of throughput of the previously described polyester process, thereby allowing a commensurate decrease in the size of plant required. This is achieved by means of lower viscosity impregnants based on acrylate or methacrylate esters which are preferably largely monofunctional (i.e. only have one addition polymerisable bond). It has been found possible to adjust the proportions of catalyst and inhibitor so that whilst adequate stability of impregnant in the vat is ensured, it nevertheless undergoes polymerisation in less than 10 minutes in hot water at 90° C. Removal of impregnant from the surface prior to curing is carried out by water/detergent rinses.

Among suitable mono-functional esters are those having the formula:

where $R_1$ is H or $CH_3$, $R_2$ is $C_n H_{2n+1}$ or $C_n H_{2n}OH$ (where n is 1-18, preferably 4-14), $CH_2CH_2O(CH_2CH_2O)_xH$ or $CH_2CH(CH_3)O[CH_2CH_2(CH_3)O]_xH$, where x is 0 to 10 (the units optionally being reversed in the case of propylene glycol). As examples, methyl methacrylate, butyl acrylate, hydroxypropyl acrylate, 2-ethyl-hexyl acrylate and lauryl methacrylate may be cited. Although many monoesters of acrylic and/or methacrylic acid may be employed, the actual choice will be governed on the one hand by avoidance of too high a volatilitity and on the other by the desirability of a low viscosity. At least sufficient polyfunctional monomer should also be present in order to provide a crosslinked resin on curing.

Suitable polyfunctional monomers containing more than one polymerisable groups of the type $CH_2=C(R_1)$- where $R_1$ is H or $CH_3$, are ethylene glycol dimethacrylate, triethylene glycol dimethacrylate and trimethylol propane trimethyacrylate. The proportion of polyfunctional monomer may vary depending on the degree of solvent and heat resistance expected of the sealed casting but is desirably in the range 2–70% of the impregnating liquid and preferably lies in the range 2–40% most preferably 10–25%. The upper limit is determined in part by economic considerations as the polyfunctional esters are usually manufactured by alcoholysis reactions using the lower alkyl acrylates or methacrylates and are therefore intrinsically more expensive. More important is the fact that monofunctional acrylates or methacrylates appear to be more stable and less susceptible to anaerobic effects than polyfunctional monomers. It is a feature of the process that curing takes place in hot water even in the presence of some dissolved air. Systems which exhibit too great an anaerobic effect can cause difficulties with certain particularly active metal alloys. In extreme cases of anaerobic systems, particularly where a sintered component is involved, a thin film of partially cured resin is already present on removal from the vat and this is difficult to remove by washing and results in dirty castings.

Other monomers such as diallyl phathalate or esters based on maleates or fumarates may also be included in small quantities, as may non-polymerisable extenders such as phthalate esters. Too high a proportion of extender should be avoided as castings in contact with solvents may develop microporosity due to migration of the extender.

It may be convenient to include emulsifying agents (which term includes wetting agents and detergents) in the impregnant as an aid to subsequent water washing. The choice of emulsifying agent will be based on the usual principles and will be determined by the actual composition of the impregnant. In general the most useful emulsifiers will be found amongst those recommended for use with liquids of high polarity rather than those designed for emulsification of paraffinic oils. Although cationic and anionic emulsifiers can be used, non-ionic emulsifiers of the ethoxylated and propoxylated alcohol type are preferred, e.g. at 0.1 to 1% concentration if added to the wash water or 1 to 10% if present in the impregnant. Sodium metasilicate at a level of about 1% has been found to be effective in the wash water.

Many catalysts and inhibitors have been found satisfactory for the operation of the process. The principle governing the choice is that the combination should give rise to an impregnant, a sample of which when placed in a test tube at 90° C. should cure in a time of between 3 to 15 minutes and preferably 4 to 6 minutes. Typically the quantities may be selected within the range 0.1–5%, preferably 1–5% catalyst and 0.01–2% inhibitor. A wide range of catalysts including benzoyl peroxide, methyl ethyl ketone peroxide, various alkyl peresters, cumene hydroperoxide and AZEN have been found suitable. A similarly wide selection of inhibitors has been found suitable, including those in common use such as hydroquinone, substituted by hydroquinones such as methoxyhydroquinone and various hindered alkyl phenols; methylene blue is also useful. The viscosity of such an impregnant has been found to remain almost constant when the throughput of castings is such that there is a residence time for the impregnant in the vat of several weeks.

The time required for impregnation varies with the type of casting. In practice a time of 10 minutes at a vacuum of 2–5 mms of Hg has been found sufficient for the majority of commercially available castings. In the case of one small sintered iron component 3 minutes was found sufficient whereas in another instance the deep impregnation of wood was found to require 30 minutes. In no instance was pressure required.

Various methods of conveying the castings through the stages of the process may be used. Generally it is found convenient to pack medium sized castings in baskets constructed of steel mesh. Thus on removal from the vat, the basket can be drained over a draining tray and it is advantageous if the angle of tilt of the baskets can be altered to allow more thorough draining.

Immersion of the castings in a water/detergent tank allows impregnant to be worked from the surface within 10 minutes. Agitation should be provided to facilitate this process. The use of water as a washing medium is both economical and safer than the use of solvents. One of the greatest deterrents to widespread use of impregnation equipment is connected with effluent disposal problems. It is a feature of the process that apart from the methods available to break emulsions which will be familiar to those accustomed to dealing with the disposal of cutting oils, a simpler method has been found possible. Thus when the level of emulsified impregnant has built up to a concentration of 1–5%, the wash liquors may be pumped to a separate tank capable of raising the temperature about 80° C. For example after only 2 minutes at 100° C. the emulsion suddenly curdles and on cooling, the nearly clear supernatent liquid may be drained into the sewer leaving a damp granular solid which, being a polymer, may be disposed of as an inoffensive almost odourless solid waste. At 90° C. curdling may take 20 minutes.

Following rinsing, the castings are drained for a few moments and then transferred to the curing tank. The use of hot water, being a feature of the invention, to cure the impregnant offers several advantages over other alternative procedures. The hot water acts as an additional washing medium to remove traces of partially emulsified impregnant from the surface of the casting, particularly from the inside of tapped holes. It is commonly found that processes employing oven curing result in dirty castings and this imposes limitations on the type of casting which may be sealed by this method. Another advantage in curing in hot water arises from the fact that, as is well known, many monomers of which methacrylates and styrene are examples are inhibited by air and consequently satisfactory curing of resin takes place even at the surface of the pores where the water acts as a barrier. With low viscosity impregnants there is obviously a risk that hot oils or solvents might leach impregnant from the larger pores before curing could take place. The use of hot water has been found to be satisfactory in this respect. Thus plating processes, to be successful, require that the level of resin in the pores should be such that entrapment of plating fluids beneath the metal plating is avoided. Satisfactory plating of sintered parts has been shown to be possible using the process of the invention. It is also convenient that on removal of casting from the hot water almost immediate evaporation of water occurs and when cool, the castings are immediately ready for pressure testing or any further engineering operations.

The temperature of the water in the curing tank should be such that an adequate margin exists for curing the monomer in the time alloted for immersion. In a preferred embodiment of the invention the impregnant will have a curing time of 90° C at 4–6 minutes and immersion will be for 10 minutes at 90° C. At 80° C immersion should be 15 minutes as the same impregnant will require 10–15 minutes to cure. It will be clear that at temperatures above 95° C the presence of steam will become increasingly inconvenient. Below 70° C, the required immersion time to ensure satisfactory curing lengthens considerably unless the catalyst/inhibitor balance is altered. However this implies that the stability of the impregnant in the vat is reduced. It is therefore desirable that the curing temperature should be in the range 80° C – 95° C and preferably close to 90° C.

A feature of the preferred process is therefore that although several stages are involved, none require longer than 10 minutes and this allows a sequence of baskets containing castings to be processed in an unusally compact design of plant.

Although vacuum impregnation is the preferred method of carrying out the invention, pressure impregnation could be used or indeed the article could simply be dipped into the impregnant.

The invention is illustrated by the following Examples:

EXAMPLE 1

Aluminium castings were placed in a wire basket and vapour degreased with chlorinated solvent to remove dirt. When cold the basket was placed in an autoclave until covered with a mixture of butyl acrylate (80 parts), allyl methacrylate (15 parts), benzoyl peroxide (1 part) and hydroquinone (0.01 parts). A vacuum of 20 mm Hg was applied for 10 minutes. After bringing to atmospheric pressure the basket was removed and allowed to drain. It was then lowered into a tank of cold water and agitated. For greater ease of washing, an ethoxylated secondary alcohol emulsifier is added at a level of 0.1% to 1%. The basket was then removed and placed in a tank of hot water at 80° C for 15 minutes after which time it was removed and allowed to dry. Subsequent pressure tests showed that satisfactory sealing had occurred.

EXAMPLE 2

Several steel castings were vapour degreased and placed in an autoclave until covered with an impregnant containing butyl methacrylate (90 parts), ethylene glycol dimethacrylate (5 parts) benzoyl peroxide (1 part) and methoxy hydroquinone (0.02 parts). A vacuum of 10 mms Hg was applied for 10 minutes and the washing and curing procedure was similar to Example 1.

EXAMPLE 3

A magnesium alloy having very fine pores was placed in an autoclave after degreasing and impregnated with a mixture of 2-ethyl-hexyl acrylate (85 parts), butane diol demethacrylate (10 parts), methyl ethyl ketone peroxide (3 parts), hydroquinone (0.01 parts) and oxyethylated secondary alcohol emulsifier (1 part). A vacuum of 5 mm Hg pressure was applied for 5 minutes. The subsequent treatment was similar to Example 1.

EXAMPLE 4

A number of sintered parts were placed in an autoclave after ensuring that no oil was trapped in the pores. The impregnating liquid was composed of 2-ethyl-hexyl methacrylate (90 parts), trimethylol propane trimethacrylate (5 parts), benzoyl peroxide (1 part) and hydroquinone (0.01 parts). A vacuum of 5 mms was applied for 10 minutes and the subsequent treatment was similar to Example 1.

EXAMPLE 5

Several hundred stainless steel sintered parts were placed in a cylindrical cage capable of being rotated around its central axis. The assembly was lowered into an autoclave containing impregnant consisting of 80 parts hydroxyethyl methacrylate, 20 parts tetraethylene glycol dimethacrylate, 0.05 parts 2,5-ditertiary butylhydroquinone and 4 parts tertiary butyl perbenzoate. A vacuum of 5 mm was applied for 10 minutes and after releasing the vacuum the sintered parts were subjected to a tumbling action which facilitated draining. Rotation of the cylinder whilst in a tank of water containing 2% of a detergent of the oxyethylated nonyl phenol type was found to improve washing. When a large number of small components are in close proximity it is possible for pockets of impregnant to remain trapped and this may lead, after curing, to the appearance of tenaciously held white deposits; rotation avoids this. Curing was carried out for 10 minutes in a hot water tank at 90° C. Ten sintered parts were selected at random and on pressure testing at 80 psi no leaks were discovered.

EXAMPLE 6

Several hundred sintered brass bushes were sealed using the impregnant and procedure described in Example 5. Of a random selection tested at 80 psi, none leaked.

EXAMPLE 7

Five sintered parts consisting largely of iron were impregnated employing a polyester process similar to that described above in relation to the prior art. A further five were processed by the method of Examples 5 and 6. Both sets were cadmium plated by a commercially used process. Whereas the polyester process produced areas of tarnished appearance, the plating on those samples impregnated as in Examples 5 and 6 was pronounced to be satisfactory.

EXAMPLE 8

Several pieces of beechwood measuring approximately 30 × 4 × 4 cms were impregnated for 30 minutes under a vacuum of 5mm using the following impregnant:

|  | % |
| --- | --- |
| Methylene blue | 0.025 |
| Trimethylol propane trimethacrylate | 70.0 |
| 2-Ethyl-hexyl acrylate | 30.0 |
| Benzoyl peroxide powder (50%) | 0.5 |

The washing cycle was 1 minute and curing took place at 90° C. for 10 minutes in a water bath with as little agitation as possible. On breaking a piece of the wood the deep penetration of the impregnant could be observed by the blue colouration.

Similarly several ceramic articles measuring 15 × 1 × 0.5 cms were impregnated for 3 minutes and deep penetration was observed.

EXAMPLE 9

The procedure of Example 1 was repeated using the following impregnant:

| | |
| --- | --- |
| Benzoquinone | 0.75% |
| AZBN* | 1.0% |
| Trimethylol propane trimethacrylate | 70 (approx.) |
| Stearyl methacrylate | 30 (approx.) |

*2,2'-azobisisobutyronitrile

I claim:

1. A method of impregnating porous rigid articles which comprises causing the pores to be filled with an impregnant comprising a liquid which comprises 60–98% wt. of (meth)acrylic monomer and 2–40% wt. of polyfunctional monomer, 0.1–5% wt. of free radical catalyst and 0.01–2% wt. of inhibitor for said catalyst, said inhibitor and catalyst being selected such that curing can be effected in hot water at a temperature of at least 90° C. within 3 to 15 minutes, washing the article with water or with water and an emulsifier if an emulsifier is not present in the impregnant to remove excess impregnant from the surfaces of the article and curing the impregnant by heating the article in hot water to a temperature of not greater than 100° C.

2. The method of claim 1, wherein said impregnant contains 0.1–5% peroxy or AZBN catalyst and 0.01–2% inhibitor.

3. The method of claim 2, wherein the peroxy catalyst is benzoyl peroxide, methyl ethyl ketone peroxide or an alkyl perester.

4. The method of claim 1, wherein the inhibitor is hydroquinone or a substituted derivative thereof or an alkylated phenol.

5. The method of claim 1, wherein said impregnant additionally contains up to 10% wt. of an emulsifier.

6. A method according to claim 1, wherein the article is submerged in the impregnant during impregnation.

7. The method of claim 1, wherein the impregnant comprises 10–25% wt. polyfunctional monomer and 75–90% wt. monofunctional monomer.

8. The method of claim 1, wherein the monomer system of the impregnant is substantially wholly (meth)acrylic ester.

9. The method of claim 8 wherein the impregnant comprises allyl methacrylate, a diol dimethacrylate, or a triol trimethacrylate.

10. The method of claim 8 wherein the impregnant comprises, as monofunctional ester, a $C_{1-18}$ alkyl or hydroxyalkyl (meth)acrylate or a mono(meth)acrylate of a mono- or polyethylene glycol or of a mono- or polypropylene glycol.

11. The method of claim 10 wherein the monofunctional ester is methyl methacrylate, butyl acrylate, hydroxypropyl acrylate, 2-ethylhexyl acrylate or lauryl methacrylate.

12. A method according to claim 1 wherein curing is effected at a temperature in the range 80°–95° C.

13. A method according to claim 1 or 6, wherein the articles are metal castings.

14. A method according to claim 1 or 6 which comprises degassing the article under reduced pressure to effect impregnation.

15. The method of claim 1 wherein the impregnant comprises 10-25% wt. polyfunctional monomer, and 75-90% wt. monofunctional monomer; the catalyst is selected from the group consisting of AZBN, benzoyl peroxide, methyl ethyl ketone peroxide, and alkyl peresters; the inhibitor is selected from the group consisting of hydroquinone, substituted derivatives of hydroquinone, and alkylated phenols; and the impregnant additionally contains up to 10% wt. of an emulsifier.

16. The method of claim 15, wherein the monomer system of the impregnant is substantially wholly (meth)acrylic ester.

17. The method of claim 16, wherein the monomer system of the impregnant comprises allyl methacrylate, a diol dimethacrylate, or a triol trimethacrylate.

18. The method of claim 15, wherein said monofunctional monomer is a monofunctional ester selected from the group consisting of $C_{1-18}$ alkyl or hydroxyalkyl (meth)acrylate, mono(meth)acrylates of a mono- or polyethylene glycol, and mono(meth)acrylates of a mono- or polypropylene glycol.

19. The method of claim 18, wherein said monofunctional ester is selected from the group consisting of methyl methacrylate, butyl acrylate, hydroxypropyl acrylate, 2-ethylhexyl acrylate and lauryl methacrylate.

* * * * *